3,071,517
PROCESS OF PRODUCING FERMENT PREPARATIONS AND PRODUCTS OBTAINED THEREBY

Felix Grandel, Inningen, near Augsburg, and Hans Neumann, Augsburg, Germany, assignors to Keimdiaet G.m.b.H., Augsburg, Germany, a corporation of Germany
No Drawing. Filed Aug. 15, 1955, Ser. No. 528,549
Claims priority, application Germany Aug. 20, 1954
8 Claims. (Cl. 195—71)

The present invention relates to a new and improved process of producing preparations containing ferments and more particularly to a process of producing preparations containing ferments from vegetable seed material and to products obtained thereby.

It is known that vegetable seeds, on germination, produce ferments, especially amylases. When, for instance, barley is caused to germinate, it yields malt which is rich in enzymes. Said malt is of great importance in the brewery and distillery industries. It is also known to produce malt from wheat and oat and to carry out such production on a large scale.

Another known process of producing ferments comprises cultivating certain fungi on various cereal materials by surface culture or by the submerged culture method. For this purpose, either molds, for instance, of the Aspergillus type, or bacterial cultures, for instance, cultures of Bacillus mesentericus, or cultures of algae-like microorganisms are cultivated and used for producing ferment preparations. The amount of ferments formed on malting as well as on cultivating fungi and other microorganisms is, however, quite small. Green malt from barley, for instance, ordinarily does not contain more than 400 diastase units per 100 g. malt and the ferment content of other types of malt is even lower. When cultivating fungi on cereal material it is possible to produce final products with a higher ferment content. However, the capacity of said microorganisms to form ferments is still quite limited.

It is one object of the present invention to provide a new and improved process of producing ferments from vegetable seed material which process yields a heretofore unknown yield of ferments and can readily be carried out.

Another object of the present invention is to provide new preparations rich in ferments as they are obtained by the process according to the present invention.

Still another object of the present invention is to provide a new and valuable auxiliary agent for baking which is rich in ferments and far superior in its baking power to other ferment preparations.

A further object of the present invention is to provide a new and valuable addition to animal feed which is especially suitable for growing young animals and for fattening hogs.

Another object of the present invention is to provide a new and valuable dietetic and therapeutically useful agent rich in ferments which agent is of special value in the control of gastro-intestinal and other disturbances caused by ferment deficiency.

Other objects of the present invention and advantageous features thereof will become apparent as the description proceeds.

In principle, the process according to the present invention consists in a combination process whereby vegetable seeds are caused to germinate and whereby, simultaneously, ferment-producing microorganisms are cultivated on said germinating seeds. Thereby, it is important that cultivation is carried out under conditions whereby no infection by harmful foreign microorganisms can take place.

To achieve optimum ferment formation, the vegetable seeds and especially cereal seeds, such as wheat, are preferably first steeped in water for at least 12 hours. The steeped seeds are quickly washed with a dilute acid solution, for instance, with 1% citric acid solution, are then spread on hurdles or on the kiln floor of breweries, or the like, inoculated with cultures of ferment producing microorganisms, such as cultures of Aspergillus oryzae, and are caused to germinate while, at the same time, said microorganisms are cultivated thereon. The chamber wherein germination and cultivation take place as well aerated and of proper humidity. The resulting combination of wheat malt and mold and the like culture has an exceptionally high ferment content. The mixture is carefully dried and, if desired, ground.

A ferment concentrate obtained in this manner is especially useful as auxiliary agent in baking and as an additive to animal feed. Due to its high diastase content the fermented malt according to the present invention is far superior to ordinary malt and also to most ferment concentrates obtained on cultivation of molds and other ferment producing microorganisms in the usual manner. It has a very favorable effect upon raising young animals and upon fattening hogs when added to animal feed. This effect is due to its probiotic activity.

The use of combinations of malt and mold and the like cultures according to the present invention as a dietetic and therapeutic agent has many advantages over the use of known ferment preparations. Said combination of vegetable ferments formed on germination with ferments produced on cultivating molds and bacteria exerts very favorable effects upon gastro-intestinal disturbances and conditions caused by ferment deficiency.

Therefore, the new combination is especially suitable as dietetic and therapeutic ferment agent in the treatment of such gastro-intestinal disturbances and conditions. The combination may also be used percutaneously in the form of ointments, or for cosmetic purposes, for instance, for face masks, foot packs, and the like and, in such a form, exerts a proteolytic and lipolytic effect upon the skin.

The following examples illustrate the present invention without, however, limiting the same thereto.

Example 1

1,000 kg. of wheat are steeped in a tank in 4,000 l. of water and are allowed to stand overnight. The next morning the steeping liquor which is not absorbed by the wheat is drained off and the steeped wheat is rapidly washed with an aqueous 1% citric acid solution. The washed wheat is spread on trays, placed into an incubating chamber, and inoculated with spores of Aspergillus oryzae. The germinating chamber is well aerated and is adjusted to constant humidity of 40%. Germination of the wheat seeds and, at the same time, cultivation of Aspergillus oryzae, take place in said chamber. The germinating and cultivating temperature is kept between about 28° C. and about 38° C. Maximum growth of the mold is achieved after about 3 days. The germinated and moldy wheat is carefully dried at a temperature not exceeding about 40° C. and is ground. The resulting flour serves as auxiliary agent in baking or is used for producing dietetic and pharmaceutical preparations.

Example 2

100 kg. of oats are steeped in 500 l. of water and are allowed to stand for 12 hours. Excess steeping water is drained off and the steeped and swollen oats are washed with an 0.5% phosphoric acid solution. The washed oats are spread on floors and are inoculated with spores of Aspergillus niger. The oats are kept humid by occasional spraying with water. The humidity of the germinating chamber is adjusted to about 70% and the germinating and cultivating temperature is maintained at about 38° C. Germination is completed after 3 days and the oats have become moldy through and through. It is carefully dried at a temperature below 40° C. and is coarsely ground. After mixing the resulting moldy, germinated oat with 3% of lime, it is used as additive to fattening feed for hogs and for raising young animals.

In place of wheat and oats used in the preceding examples, there can be employed as cereal starting material barley, rye, rice, corn, or other cereals which are steeped, washed with acid, germinated, and at the same time used as nutrient medium for cultivating ferment producing molds and other microorganisms by following the procedure described in said preceding examples.

In place of *Aspergillus oryzae* and *Aspergillus niger* used as ferment producing molds in the preceding examples, there can be employed other ferment producing microorganisms, such as other molds of the genus Aspergillus or the genera Mucor and Penicillium, for instance, *Aspergillus parasiticus, Aspergillus candidus, Aspergillus flavus*, the "black" aspergilli, *Aspergillus fumigatus, Mucor racemosus, Mucor rouxii, Penicillium glaucum*, various types of yeasts, and others.

As stated hereinabove, ferment producing bacteria may also be cultivated on germinating cereal seeds according to the present invention. Such bacteria are, for instance, *Bacillus mesentericus, Bacillus hydrolyticus, Bacillus moriguchiensis* and other bacilli of the *Bacillus adherens* group, *Bacillus subtilis, Escherichia coli, Proteus vulgaris, Clostridium butyricum*, and others.

In place of dilute phosphoric acid and citric acid solutions preferably employed for washing the steeped cereal seeds, there can be used other dilute inorganic or organic acids, such as tartaric acid, lactic acid, malic acid, acetic acid, hydrochloric acid, sulfuric acid.

The concentration of said acids must, preferably, not substantialy exceed about 1% although acid solutions of higher concentrations may also be used provided they are not kept in contact with the steeped seed for too long a period of time.

Optimum cultivation and germination temperatures, humidity, and duration depend, of course, upon the cereal seed and the ferment producing microorganism employed and can readily be determined by preliminary experiments. Ordinarily, germination and cultivation are carried out at a temperature between about 25° C. and about 38° C. and at a humidity between about 60% and about 80%, although temperature and humidity are not limited to said values.

The amounts of ferments present in the germinated moldy wheat preparation of Example 1 or the germinated moldy oat preparation of Example 2 or in other preparations according to the present invention are at least as high as 800 units of amylolytic ferments and 200 units of proteolytic ferments per 100 g. of said preparations.

The new preparations which are enriched in ferments, may also be used for the production of ferments in a highly purified form by methods as they are conventionally used in the isolation of ferments from vegetable material and/or from microorganisms.

Of course, many other changes and variations in the vegetable seeds and ferment producing microorganisms employed, in the pretreatment of the vegetable seeds, in the germination and cultivation conditions, temperature, humidity, and duration, in the methods of working up the germinated and moldy vegetable seeds, in their use for dietetic, medicinal, cosmetic, animal feeding and raising, and other purposes and the like may be made by those skilled in the art in accordance with the principles set forth herein and in the claims annexed hereto.

We claim:

1. In a process of producing ferment preparations, the steps comprising steeping cereal seeds in water, removing the unabsorbed steeping water, washing the steeped seeds with a dilute aqueous solution of an acid, initiating germination in the washed seeds, inoculating the germinating seeds with a ferment producing mold, cultivating said mold on said germinating seeds during germination thereof until germination and cultivation are substantially completed, and carefully drying the resulting germinated seed culture of said ferment producing mold at a temperature not substantially exceeding 40° C.

2. The process of producing ferment preparations according to claim 1, wherein the cereal seeds are cereal seeds selected from the group consisting of wheat, rye, oat, barley, and corn.

3. The process of producing ferment preparations according to claim 1, wherein the dilute aqueous solution of an acid is an aqueous solution of an organic acid selected from the group consisting of citric acid, tartaric acid, and acetic acid.

4. The process of producing ferment preparations according to claim 1, wherein the dilute aqueous solution of an acid is an aqueous solution of an inorganic acid selected from the group consisting of phosphoric acid, hydrochloric acid, and sulfuric acid.

5. The process of producing ferment preparations according to claim 1, wherein the ferment producing mold is a pure culture of the mold *Aspergillus oryzae*.

6. The process of producing ferment preparations according to claim 1, wherein the ferment producing mold is a pure culture of the mold *Aspergillus niger*.

7. The process of producing ferment preparations according to claim 1, wherein the dried germinated seed culture of the ferment producing mold is ground.

8. In a process of producing ferment preparations, the steps which comprise cultivating a ferment producing mold on a germinating cereal seed culture medium, said germinating cereal seed being obtained by steeping cereal seeds in water, removing the unabsorbed steeping water, washing the steeped seeds with a dilute aqueous solution of an acid, and initiating germination in the washed seeds, continuing cultivation of said mold and germination of said seed to optimum ferment production, and drying the resulting germinated seed culture of said ferment producing mold at a temperature not substantially exceeding 40° C.

References Cited in the file of this patent

UNITED STATES PATENTS

| Number | Name | Date |
|---|---|---|
| 991,561 | Takamine | May 9, 1911 |
| 1,068,028 | Wahl | July 22, 1913 |
| 1,178,040 | Wahl | Apr. 4, 1916 |
| 1,247,349 | Wahl et al. | Nov. 20, 1917 |
| 1,260,899 | Harris | Mar. 26, 1918 |
| 1,263,817 | Takamine | Apr. 23, 1918 |
| 1,274,898 | Kohman | Aug. 6, 1918 |
| 1,851,165 | Farr | Mar. 29, 1932 |
| 1,914,244 | Dixon | June 13, 1933 |
| 1,950,418 | Schreier | Mar. 13, 1934 |
| 2,238,862 | Neugelbauer | Apr. 15, 1941 |
| 2,427,323 | Dixon | Sept. 9, 1947 |
| 2,436,818 | Musher | Mar. 2, 1948 |
| 2,486,396 | Erlich | Nov. 1, 1949 |
| 2,651,593 | Goering et al. | Sept. 8, 1953 |
| 2,665,209 | Brodhacker | Jan. 5, 1954 |
| 2,751,303 | Burroughs | June 19, 1956 |